(No Model.)
G. SOBOTKA.
MAKING VINEGAR.
No. 458,985. Patented Sept. 1, 1891.
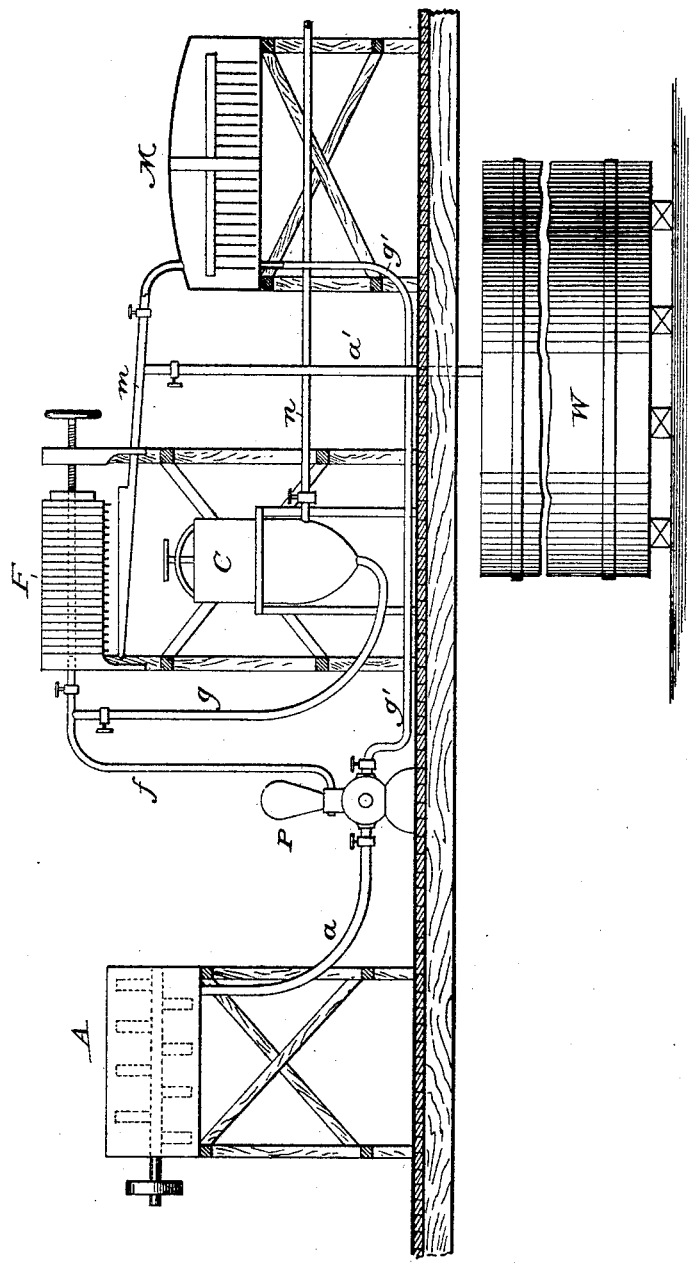
Witnesses:
J. Henry Kaiser
Arthur E. Dowell
Inventor:
Gustav Sobotka
By Butterworth & Dowell
his attorneys

UNITED STATES PATENT OFFICE.

GUSTAV SOBOTKA, OF NEW YORK, N. Y., ASSIGNOR TO FLEISCHMANN & CO., OF SAME PLACE.

MAKING VINEGAR.

SPECIFICATION forming part of Letters Patent No. 458,985, dated September 1, 1891.

Application filed October 17, 1890. Serial No. 368,465. (No specimens.)

*To all whom it may concern:*

Be it known that I, GUSTAV SOBOTKA, a citizen of Austria-Hungary, and a resident of the city of New York, in the county of New York and State of New York, have invented certain new and useful Improvements in Making Vinegar, of which the following is a specification.

This invention relates to improvements in making vinegar; and the object of my invention is to produce a malt liquor which is adapted to be readily converted into vinegar, all as will be hereinafter described, and particularly defined in the claims at the end of this specification.

In the accompanying drawings an elevation, parts in section, of the improved apparatus which I use in making clear wort used in the manufacture of vinegar is shown.

In malting such cereals—for instance, like corn - malt—the temperature necessary for liquefying the starch must be higher than the temperature needed for saccharification. The finely-ground malt, after having been steeped and agitated in cold water for a time in the mixing apparatus A, is forced by pumps P through the pipes $a$ and $f$ into and through the filter-press F, whereby the clear malt extract is separated from the remaining grains. This process is known as the "first pressing." The solution of malt extract obtained by the said first pressing runs from the filter-press F through the pipe $m$ to the mashing-tub M, in which tub a quantity of finely-ground rye or other grain is added and said malt-extract solution and rye or other grain mixed therewith. The cakes of grain from which the clear malt extract has been obtained, as above set forth, are taken from the press F and mixed with water and with the cakes of the third pressing (to be described hereinafter) by a previous mash and are conveyed in any suitable manner to the pressure-tank C, where the entire mixture is boiled under a high pressure, thus converting all the starch to its liquid form, and also making soluble the nitrogenous substances contained in the grain which have not been dissolved heretofore. The pipe $n$ serves for conveying steam into the pressure-tank C. The steam-pressure in the pressure-tank C is now used to force the contents of said tank through the pipes $g$ and $f$ into the filter-press F, whereby the liquid starch and the albuminoids in solution are separated from the grain remaining in the finely-extracted grains. This operation is known as the "second pressing." The cakes produced by the second pressing are removed and used as cattle-food. The solution forced out of the grains by the said second pressing is nearly boiling hot and is conducted into the mash-tub M through the pipe $m$. The heat of the said solution is used to bring the entire contents of the mash-tub to the temperature necessary for saccharification, which is accomplished by the solution of diastase extracted from the malt in the first pressing. After the saccharification is completed the mash is pumped by means of the pump P through the pipes $g'$ and $f$ into the filter-press for the purpose of obtaining an absolutely clear wort. This operation is known as the "third pressing." The cakes remaining in the press after the third pressing are mixed with the cakes resulting from the first pressing by the next following mash and boiled under pressure in the manner described above. The clear wort is conducted by the pipe $a'$ to the fermenting-tub $w$, where it is fermented with compressed yeast, and after the fermentation ceases the beer is poured into vats, where it remains for a sufficient time to settle all yeast and "mycoderma aceti." The clear alcohol solution is then drawn off and used for charging vinegar-converters of any desired construction.

In another application filed on the same date herewith, Serial No. 368,466, I have described and claimed the method of producing the clear wort, and do not claim it in this application.

Having thus described my invention, I claim as new, and desire to secure by Letters Patent—

1. The process, substantially as described, of making a malt liquor adapted for conversion into vinegar, which consists in pressing a malt-extract solution out of ground steeped malt, mixing said malt-extract solution with finely-ground rye or other grain, mixing the cakes of grain of said pressing with water and with cakes of grain taken from a pressing subsequent to the first pressing in a preceding similar process or mash, boiling this mixture under high pressure, pressing out the liquid from said boiled mixture, adding said liquid to the mixture of malt extract and rye or other grain, pressing this mixture to obtain clear wort, fermenting the clear wort with compressed yeast, and after settling drawing off the clear alcoholic solution for charging purposes, substantially as set forth.

2. The herein-described process of making a malt liquor adapted to be converted into vinegar, which consists in pressing a malt-extract solution out of ground steeped malt, mixing said malt-extract solution with finely-ground rye or other grain, mixing the cakes of grain of the first pressing with water and with cakes of grain of the third pressing by a previous mash, boiling this mixture under high pressure, pressing out the liquid from said boiled mixture, adding said liquid to the mixture of malt extract and rye or other grain, pressing this mixture to obtain clear wort, fermenting the clear wort with compressed yeast, and after settling drawing off the clear alcoholic solution, substantially as set forth.

In testimony that I claim the foregoing as my invention I have signed my name in presence of two subscribing witnesses.

GUSTAV SOBOTKA.

Witnesses:
OSCAR F. GUNZ,
MARTIN PETRY.

It is hereby certified that in Letters Patent No. 458,985, granted September 1, 1891, upon the application of Gustav Sobotka, of New York, N. Y., for an improvement in "Making Vinegar," an error appears in the printed specification requiring the following correction, viz.: On page 1, line 19, the word "malting" should read *mashing;* and that the said Letters Patent should be read with this correction therein that the same may conform to the record of the case in the Patent Office.

Signed, countersigned, and sealed this 24th day of November, A. D. 1891.

[SEAL.]
CYRUS BUSSEY,
*Assistant Secretary of the Interior.*

Countersigned:

W. E. SIMONDS,
*Commissioner of Patents.*